United States Patent [19]

Ulrich et al.

[11] Patent Number: 4,676,909
[45] Date of Patent: Jun. 30, 1987

[54] PROCESS FOR RECOVERING NOBLE METALS FROM THEIR CYANIDE COMPLEXES

[75] Inventors: Hannsjörg Ulrich, Erftstadt; Peter Prestin, Hürth, both of Fed. Rep. of Germany

[73] Assignee: Hoechst Aktiengesellschaft, Fed. Rep. of Germany

[21] Appl. No.: 789,701

[22] Filed: Oct. 21, 1985

[30] Foreign Application Priority Data

Nov. 2, 1984 [DE] Fed. Rep. of Germany ....... 3440086

[51] Int. Cl.$^4$ .......................... C02F 1/28; C22B 11/00
[52] U.S. Cl. .................................... 210/665; 210/668; 210/684; 210/688; 210/721; 210/904; 210/912; 75/118 R; 75/118 P; 423/25
[58] Field of Search ............... 210/904, 912, 756, 759, 210/688, 684, 721, 668, 665; 75/118 R, 118 P; 423/23, 25, 38–40, 34

[56] References Cited

U.S. PATENT DOCUMENTS

| | | | |
|---|---|---|---|
| 3,617,567 | 11/1971 | Mathre | 210/904 |
| 4,176,060 | 11/1979 | Sury et al. | 210/904 |
| 4,392,962 | 7/1983 | Lehr et al. | 210/912 |
| 4,416,786 | 11/1983 | Knorre et al. | 210/904 |
| 4,445,935 | 5/1984 | Posey et al. | 75/118 P |
| 4,446,029 | 5/1984 | Betermier et al. | 210/904 |

FOREIGN PATENT DOCUMENTS

| | | | |
|---|---|---|---|
| 2233532 | 1/1973 | Fed. Rep. of Germany | 210/904 |
| 1564915 | 4/1969 | France | 210/904 |
| 55-25915 | 9/1980 | Japan . | |
| 1049856 | 10/1983 | U.S.S.R. | 75/118 P |

*Primary Examiner*—Benoit Castel
*Attorney, Agent, or Firm*—Connolly and Hutz

[57] ABSTRACT

Noble metals are recovered from their cyanide complexes in aqueous solution by reaction with red phosphorus. To this end, red phosphorus is used in quantities of 1 to 5 weight %, based on the aqueous solution of the noble metal cyanide complex, in combination with an additional strong oxidizing agent.

12 Claims, No Drawings

PROCESS FOR RECOVERING NOBLE METALS FROM THEIR CYANIDE COMPLEXES

BACKGROUND OF THE INVENTION

The present invention relates to a process for recovering noble metals from their cyanide complexes in aqueous solution by reaction with red phosphorus.

U.S. Pat. No. 4,392,962 discloses a process for separating seminoble or noble metals from an aqueous solution having compounds of these metals dissolved therein, wherein the aqueous solution is dropped through a column subdivided into two zones. Placed in the upper zone is a layer of granular red phosphorus which may be admixed with active carbon, and placed in the lower zone is a layer of active carbon.

This process can be used for recovering seminoble or noble metals present as ions or in form of complexes. In the latter case, it is however necessary for the complexes to have a low stability, which is determined by the nature of the ligands, i.e. in which the equilibrium of these complexes is substantially on the side of the ionic solution. This condition is met by the silver diamine complex, for example, which can smoothly be reduced to elementary silver in the manner described. Already more difficult to reduce is the silver thiosulfate complex which exists, for example, in spent fixing baths as used for photographic processes. In order to reduce the silver thiosulfate complex to elementary silver, it is necessary for the above known process to be modified, i.e. for it to be effected at increased temperature and at a pH between 8 and 10. But even these flanking operational steps do not permit reducing noble metals which exist as cyanides—these being one of the most important commercial complex systems—to be reduced to elementary metal.

Large quantities of waste water containing 100 mg/l and more silver and/or gold are customarily obtained in the galvanic and gold and silver separating or plating industries. Under commercial aspects, it is not acceptable for such waste water with its high noble metal content to be lost; on the other hand, it is also ecologically pollutive material contaminating surface waters. This is one of the reasons why it is not allowable for the silver content of waste water delivered to a drainage system to exceed a certain upper limiting value. In addition, such waste water is rendered remarkably pollutive by the cyanide it contains. For all these reasons, it is invariably necessary for the waste water, which is to be delivered to a drainage system, to be first subjected to an expensive multistage clarification and decontamination process during which the noble metals are recovered by the exchange of ions, e.g. by a process as disclosed in Japanese Specification JP-AS No. 55-25915.

It is therefore desirable to have a process for recovering noble metals existing as cyanide complexes in aqueous solution which is easy to carry out under commercially acceptable conditions and permits the cyanides to be simultaneously destroyed.

SUMMARY OF THE INVENTION

To this end, the present invention provides for the aqueous solution containing the noble metals as cyanide complexes to be reacted with 1 to 5 wgt % red phosphorus, based on the aqueous solution, and to be additionally reacted with a strong oxidizing agent.

DETAILED DESCRIPTION OF THE PREFERRED EMBODIMENTS

Further preferred and optional features of the invention provide:

(a) for the reaction to be effected at a temperature higher than 80° C.;

(b) for a hypochlorite solution, preferably an alkali metal hypochlorite solution, to be used as the oxidizing agent;

(c) for a chlorine bleaching liquor to be used;

(d) for the hypochlorite solution to be used in a quantity of 1 to 20 volume %, preferably 5 to 10 volume %, based on the aqueous solution of the noble metal cyanide complex;

(e) for an aqueous peroxide solution to be used as the oxidizing agent;

(f) for hydrogen peroxide containing 1 to 30 wgt % $H_2O_2$ to be used;

(g) for the aqueous peroxide solution to be used in a quantity of 0.5 to 20 volume %, preferably 1 to 5 volume %, based on the aqueous solution of the noble metal cyanide complex.

The process of this invention permits the noble metals present as cyanide complexes in the solution to be reduced to elementary matter and the cyanide ions to be simultaneously destroyed oxidatively.

Gold cyanide complexes are reduced by effecting the reaction at a temperature higher than normal for the present process.

After reaction, the suspension obtained should conveniently be filtered and the filtrate should optionally be neutralized: the red phosphorus loaded with the noble metal is either used once again, depending on its degree of load, or admitted to a noble metal/phosphorus-parting stage. Air coming from the filtration stage should be scrubbed with gas, for reasons of safety.

EXAMPLE 1 (COMPARATIVE EXAMPLE)

500 ml $Na[Ag(CN)_2]$-solution (taken from the rinsing basin of a galvanic plant) containing 100 mg silver/l was admixed with 25 ml commercial chlorine bleaching liquor (13% active chlorine) and heated for 8 hours to 100° C. with agitation. A small quantity whitish precipitate was obtained. The filtrate obtained after separation of the precipitate still contained 56 mg silver/l and 29 mg cyanide/l.

EXAMPLE 2 (COMPARATIVE EXAMPLE)

500 ml $Na[Ag(CN)_2]$-solution the same as that used in Example 1 was admixed with 10 g red phosphorus (grade NF, a product of HOECHST AKTIENGESELLSCHAFT, Werk Knapsack) and boiled for 6 hours under reflux. After cooling, the suspension was filtered. The filtrate still contained 98 mg silver per liter and 52 mg cyanide per liter.

EXAMPLE 3 (INVENTION)

500 ml $Na[Ag(CN)_2]$-solution the same as that used in Example 1 was admixed with 5 g red phosphorus (grade NF, a product of HOECHST AKTIENGESELLSCHAFT, Werk Knapsack) and 25 ml commercial chlorine bleaching liquor (13% active chlorine) and the whole was stirred at room temperature. Specimens were taken at 30, 60 and 120 minute-intervals, filtered and analyzed.

| Specimen taken after | Content of | |
|---|---|---|
| minutes | silver (mg/l) | cyanide (mg/l) |
| 30 | 1.7 | 2.1 |
| 60 | <1 | <1 |
| 120 | <0.5 | <1 |

EXAMPLE 4 (INVENTION)

500 ml Na[Ag(CN)$_2$]-solution the same as that used in Example 1 was admixed with 4 g red phosphorus (grade NF, a product of HOECHST AKTIENGESELL-SCHAFT, Werk Knapsack) and 5 ml commercial chlorine bleaching liquor (13% active chlorine) and the whole was stirred for 4 hours at room temperature. Specimens were taken at 30, 60, 120 and 240 minute-intervals, filtered and analyzed.

| Specimen taken after | Content of | |
|---|---|---|
| minutes | silver (mg/l) | cyanide (mg/l) |
| 30 | 7 | 3.8 |
| 60 | 3.5 | 2.0 |
| 120 | 1 | <1 |
| 240 | <1 | <1 |

EXAMPLE 5 (INVENTION)

500 ml Na[Au(CN)$_2$]-solution (taken from the rinsing basin of a galvanic plant) containing 100 mg gold/l was admixed with 3 g red phosphorus (grade NF, a product of HOECHST AKTIENGESELLSCHAFT, Werk Knapsack) and 5 ml commercial chlorine bleaching liquor (13% active chlorine) and the whole was boiled under reflux. Specimens were taken at 30, 60 and 120 minute-intervals, filtered and analyzed.

| Specimen taken after | Content of | |
|---|---|---|
| minutes | gold (mg/l) | cyanide (mg/l) |
| 30 | 16 | 4.5 |
| 60 | 2.5 | <1 |
| 120 | <1 | <1 |

EXAMPLE 6 (INVENTION)

500 ml Na[Au(CN)$_2$]-solution the same as that used in Example 5 was admixed with 5 g red phosphorus (grade NF, a product of HOECHST AKTIENGESELL-SCHAFT, Werk Knapsack) and 25 ml commercial chlorine bleaching liquor (13% active chlorine) and boiled under reflux. A specimen was taken after 30 minutes, filtered and analyzed. The specimen contained less than 1 mg/l each of gold and cyanide ions.

EXAMPLE 7 (INVENTION)

500 ml Na[Ag(CN)$_2$]-solution the same as that use in Example 1 was admixed with 2 g red phosphorus (grade NF, a product of HOECHST AKTIENGESELL-SCHAFT, Werk Knapsack) and 6 ml perhydrol (20 wgt % H$_2$O$_2$) and the whole was stirred for 4 hours at room temperature. Specimens were taken at 30 and 240 minute-intervals, filtered and analyzed.

| Specimen taken after | Content of | |
|---|---|---|
| minutes | silver (mg/l) | cyanide (mg/l) |
| 30 | 9 | 5 |
| 240 | <0.5 | <1 |

EXAMPLE 8 (INVENTION)

500 ml Na[Au(CN)$_2$]-solution the same as that used in Example 5 was admixed with 5 g red phosphorus (grade NF, a product of HOECHST AKTIENGESELL-SCHAFT, Werk Knapsack) and 25 ml aqueous H$_2$O$_2$-solution (10 wgt % H$_2$O$_2$), gradually heated and boiled for 1 hour under reflux. A specimen was taken after 60 minutes, filtered and analyzed. It contained less than 1 mg/l each of gold and cyanide ions.

We claim:

1. A process for recovering silver from an aqueous solution containing its cyanide complexes which comprises mixing said solution with red phosphorus in quantities of 1 to 5 weight% and a strong oxidizing agent selected from the group consisting of a solution of a hypochlorite and a hydrogen peroxide in quantities of 1 to 20 volume%, both based on the aqueous solution of the silver cyanide complexes, reacting said mixture while stirring it at room temperature to obtain elemental silver in suspension, and recovering the silver by filtration.

2. The process as claimed in claim 1, wherein a hypochlorite solution is used as the oxidizing agent and comprises an alkali metal hypochlorite solution.

3. The process as claimed in claim 2, wherein the hypochlorite solution is a chlorine bleaching liquor.

4. The process as claimed in claim 1, wherein a hypochlorite solution is used as the oxidizing agent in a quantity of 5 to 10 volume%.

5. The process as claimed in claim 1, wherein a hydrogen peroxide solution is used as the oxidizing agent which contains from 1 to 30 weight% H$_2$O$_2$.

6. The process as claimed in claim 1, wherein a hydrogen peroxide solution is used as the oxidizing agent in a quantity of 1 to 5 volume%.

7. A process for recovering gold from an aqueous solution containing its cyanide complexes which comprises mixing said solution with red phosphorus in quantities of 1 to 5 weight% and a strong oxidizing agent selected from the group consisting of a solution of a hypochlorite and a hydrogen peroxide in quantities of 1 to 20 volume%, both based on the aqueous solution of the gold cyanide complexes, reacting said mixture while stirring it at temperatures higher than 80° C. to obtain elemental gold in suspension and recovering the gold by filtration.

8. The process as claimed in claim 7, wherein a hypochlorite solution is used as the oxidizing agent and comprises an alkali metal hypochlorite solution.

9. The process as claimed in claim 8, wherein the hypochlorite solution is a chlorine bleaching liquor.

10. The process as claimed in claim 7, wherein a hypochlorite solution is used as the oxidizing agent in a quantity of 5 to 10 volume%.

11. The process as claimed in claim 7, wherein a hydrogen peroxide solution is used as the oxidizing agent which contains from 1 to 30 weight% H$_2$O$_2$.

12. The process as claimed in claim 7, wherein a hydrogen peroxide solution is used as the oxidizing agent in a quantity of 1 to 5 volume%.

* * * * *